May 1, 1934.  E. A. THOMPSON ET AL  1,957,115
SHOCK ABSORBER
Filed Feb. 29, 1932
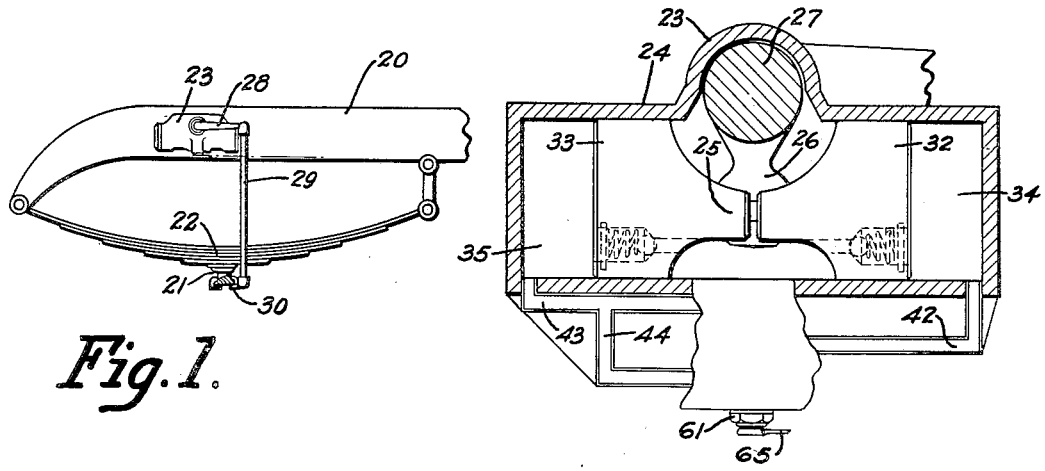
Fig.1.
Fig.2.
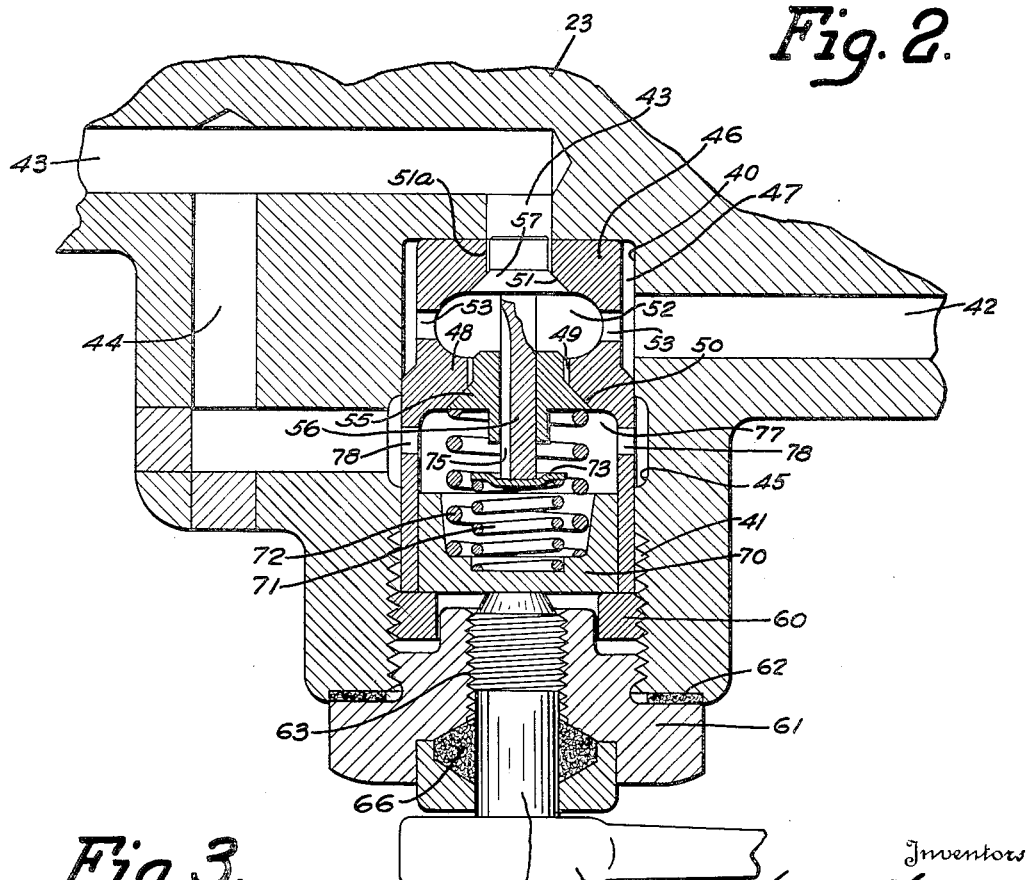
Fig.3.
Inventors
Karl A. Thompson
and Maurice Olley
By Spencer, Hardman & Zehn
Attorneys Patented May 1, 1934

1,957,115

UNITED STATES PATENT OFFICE 1,957,115

SHOCK ABSORBER

Earl A. Thompson and Maurice Olley, Detroit, Mich., assignors, by mesne assignments, to General Motors Corporation, Detroit, Mich., a corporation of Delaware Application February 29, 1932, Serial No. 595,754

6 Claims. (Cl. 188—88)

This invention relates to improvements in hydraulic shock absorbers.

It is among the objects of the present invention to provide a hydraulic shock absorber, having a fluid flow control devices therein, with an adjusting member accessible from outside the shock absorber, the operation of which will adjust the fluid flow control devices to vary the characteristics of the shock absorber.

Further objects and advantages of the present invention will be apparent from the following description, reference being had to the accompanying drawing wherein a preferred embodiment of one form of the present invention is clearly shown.

In the drawing:

Fig. 1 is a fragmentary side view of a vehicle chassis having a shock absorber embodying the present invention attached thereto.

Fig. 2 is a diagrammatic view, partly in section, showing the hydraulic shock absorber and the fluid flow passages leading from the compression chambers of the shock absorber to the fluid flow control devices.

Fig. 3 is an enlarged, fragmentary sectional view illustrating the fluid flow control devices of the shock absorber.

Referring to the drawing, the numeral 20 designates the frame of the vehicle which is supported upon the vehicle axle 21 by springs 22.

The shock absorber comprises a casing 23 providing a cylinder 24 in which a piston 25 is reciprocably supported. This piston is moved back and forth within the cylinder by a rocker lever 26 provided on a rocker shaft 27 which is journaled in the casing. One end of this rocker shaft extends outside the casing and has the shock absorber operating arm 28 secured thereto. The free end of this arm 28 is swivelly attached to one end of a link 29, the other end of said link being secured to the axle 21 by the member 30.

Piston 25 has two piston head portions designated by the numerals 32 and 33, the former forming the spring compression control chamber 34 within the cylinder 24, the latter forming the spring rebound control chamber 35 within said cylinder.

In the casing there is provided a recess 40, the outer end of which is interiorly threaded as at 41. This recess 40 is in communication with both spring compression and spring rebound control chambers. A duct 42 provides communication between the spring compression control chamber 34 and the recess 40, and a similar duct 43 provides communication between said recess 40 and the spring rebound control chamber 35. Another passage 44 leads off the duct 43 between the chamber 35 and recess 40, said passage 44 leading into an annular groove 45 in the interior surface of the recess 40 as shown in Fig. 3. From this it may be seen that duct 43 is actually in double communication with the recess 40.

A valve housing 46, cylindrical in shape, fits snugly into the recess 40, the inner end of this valve housing being of lesser diameter than the recess 40, thus providing an inner, annular chamber 47. An annular flange 48 in the valve housing provides a port 49 having a tapered portion providing a valve seat 50. Another valve seat 51 is provided in the valve housing 46, this valve seat 51 being in the channel 51a of the valve housing 46 which communicates with the duct 43. A chamber 52 is provided between the annular flange 48 and valve seat 51, this chamber 52 being in communication with the annular chamber 47 in the recess 40 through cross passages 53. Chamber 47, as may be seen in Fig. 3, is in communication with the duct 42 which leads from the spring compression control chamber 34. A valve 55 is adapted to seat upon the valve seat 50 to close the port 49 provided by the annular flange 48. Valve 55 has a central opening which slidably supports the stem 56 of the valve 57. This valve 57 is adapted to engage the valve seat 51 so as to shut off communication between the duct 43 and the interior chamber 52.

A ring member 60 is screwed into the threaded portion 41 of the recess 40 and clamps the valve housing 46 within the recess 40. A screw cap 61 is also threaded into this portion 41 of the recess, a gasket 62 being provided between the housing and said screw cap for purposes of eliminating fluid leaks at this point. Screw cap 61 has a central opening interiorly threaded as at 63 for receiving a threaded shaft 64, the end of which extends outside the screw cap 61 and has the actuator lever 65 attached thereto in any suitable manner. A packing 66 is provided around shaft 64 so as to prevent fluid leaks at this point. The end 67 of the shaft 64 engages a piston member 70 slidably supported inside the valve housing 46. This piston member 70 provides an abutment for two springs 71 and 72, the former being the smaller and lighter spring, the latter being heavier and outside spring as shown in Fig. 3. Spring 72 engages the valve 55, yieldably urging it normally to engage its seat 50. Spring 71 engages an abutment washer 73 which in turn engages the end of the valve stem 56, thereby spring 71 urges the valve 57 against the seat 51 yieldably normally to shut off communication between duct 43 and chamber 52. Valve stem 56 has a longitudinal groove 75 extending from one side of valve 55 and beyond the opposite side thereof, this groove 75 providing a constantly and restricted communication between the interior chamber 52 on one side of valve 55 and the chamber 77 between valve 55 and the piston 70. This chamber 77 is in communication with the annular groove 45 in the recess 40 through cross passages 78 in the valve housing.

The operation of the device is as follows:

When the road wheels of the vehicle, which are supported upon the axle 21, strike an obstruction in the roadway, springs 22 will be flexed or compressed, moving toward the frame 20. In response to this movement link 29 will operate the shock absorber operating arm 28 in a counter-clockwise direction as regards Figs. 1 and 2, and consequently rocker lever 26 will move the piston 25 toward the right as regards Fig. 2. Pressure is now exerted upon the fluid within the spring compression control chamber 34, the fluid thus being forced into and through the duct 42 through cross passage 53 into the inner chamber 52, a flow being established through the longitudinal groove 75 in the valve stem 56 thence into chamber 77 through cross openings 78 and from the annular groove 45 into passage 44 through duct 43 into the spring rebound control chamber 35, the cubical contents of which is being increased by the movement of the piston toward the right. When the fluid pressure cannot properly be relieved by the restricted flow through the longitudinal groove 75, then valve 55 will be moved from its seat 50 to establish a flow around the valve in addition to the flow through the groove 75.

Upon the return movement of the springs 22 toward normal position, which is termed the rebound movement, piston 25 will be moved toward the left to exert pressure upon the fluid in the rebound chamber 35. Now the fluid will flow through duct 43 against valve 57. The initial fluid flow in this direction, however, is established from the duct 43 through passage 44, cross passages 78 into chamber 77 thence through the groove 75 in the valve stem 56 into the chamber 52 from whence the fluid will flow through the cross passages 53 into duct 42 and spring compression control chamber 34. The excessive pressure, not relieved by the restricted flow through groove 75, will force valve 57 from its seat 51 against the effect of spring 71 and thereby will be established another flow from duct 43 past the valve 57 into the duct 42 and the spring compression control chamber 34.

Under certain road conditions it is desirable to have the shock absorber variable, that is, when the car is being operated over a boulevard the shock absorber need not offer as much resistance to spring action as when the car is being operated over a comparatively rough highway. In order to render the shock absorber adjustable in accordance with the nature of the road over which the vehicle is being operated, applicant has provided the adjustable abutment piston 7 forming a movable support for the springs 71 and 72, which yieldably maintain the pressure release valves against their seats. This piston or abutment member may be shifted into various positions by the actuator lever 65 and its screw shaft 64, the latter engaging the piston 70. To adjust the shock absorber for boulevard conditions, the actuator 65 is operated so that the shaft 64 is moved outwardly in the screw cap 61, thus permitting the piston 70 to move toward the ring member 60 and thus to decrease the tension of springs 71 and 72, or more specifically their pressure against their valves. Under these conditions less pressure is necessary to move the valves from their seats to establish pressure relieving flows and thus the shock aborber will offer less resistance to spring and body movements, thereby providing a softer ride. On the other hand when driving over a comparatively rough road the actuator 65 is moved to screw shaft 64 toward the piston 70, moving said piston toward the valves 55 and 57 thereby compressing the respective springs 71 and 72, causing said springs to urge the valves against their respective seats at a greater pressure. Now a greater fluid pressure will be necessary to move the valves from their seats to establish pressure relieving flows between the compression chambers and consequently the shock absorber will offer a greater resistance or greater control to the movement of the spring and body of the vehicle.

A feature of applicant's invention resides in having two valves operating in the same direction to establish flows in opposite directions between the compression chambers, said valves being yieldably urged upon their seats by springs which have a common abutment member, said abutment member being adjustable to vary the tension of the springs concurrently whereby the shock absorber may be made increasingly or decreasingly to restrict body and spring movements.

While the form of embodiment of the present invention as herein disclosed, constitutes a preferred form, it is to be understood that other forms might be adopted, all coming within the scope of the claims which follow.

What is claimed is as follows:

1. A shock absorber comprising a casing, means for circulating fluid in said casing; means for controlling said fluid circulation, comprising a plurality of valves one slidably supported upon the other and adapted, in response to fluid pressure, to establish circulating flows of fluid; separate resilient means urging said valves into closed position; and a common, manually operable member, adapted to vary the tension of all of said resilient means concurrently.

2. A shock absorber comprising a casing, means for circulating fluid in said casing; means for controlling said fluid circulation, comprising a plurality of valves one slidably supported upon the other, both adapted, in response to fluid pressure, to establish circulating flows of fluid; a piston slidable coaxially of both valves; coil springs concentrically arranged and interposed between the piston and the respective valves; and an actuator engaging the piston and adapted to be operated to move the piston to vary the tension of all of said springs concurrently.

3. A shock absorber comprising, a casing providing fluid pressure chambers; ducts connecting said chambers; valves normally closing said ducts, one of said valves being tubular, the other having a stem portion slidably supported in the tubular valve; an adjustable piston; springs interposed between the adjustable piston and the two valves, one of said springs having a greater tension than the other; and an actuator for the piston adapted to adjust the position of the piston for adjusting the tension of both springs.

4. A shock absorber for controlling the compression and rebounding movements of vehicle springs comprising, in combination a casing providing a fluid reservoir and a cylinder; a piston in said cylnder forming a compression chamber at each end thereof, one for controlling the compression movements of vehicle springs, the other for controlling rebound movements; ducts providing communication between said chambers; valves normally closing said ducts; a single, movable abutment member; a spring interposed between the abutment member and the valve normally closing the duct leading from the spring compression control chamber; another spring of lesser tension than the aforesaid spring, interposed between the abutment member and the valve normally closing the duct leading from the spring rebound control chamber; and means extending from the outside of the shock absorber into its interior adapted to engage the single abutment member for operating it to increase the tension of both valve springs concurrently.

5. A shock absorber comprising, a casing providing a fluid containing cylinder; a piston in said cylinder forming two compression chambers therein; a valve chamber in the casing; ducts leading from the respective compression chambers into the valve chamber; a tubular member in said valve chamber, providing two, spaced valve-seats in coaxial alinement; a valve normally seated upon one of said valve-seats, said valve having an opening coaxial of the valve-seat; another valve normally seated upon the other valve-seat, this valve having a stem portion slidably supported in the opening of the first mentioned valve; a piston slidably supported in the tubular member; an actuator threadedly supported in the casing, one end of the actuator engaging the piston in the tubular member for moving it; and springs supported upon the piston in said tubular member, one spring engaging one valve, the other spring engaging the stem of the other valve, both springs yieldably urging their respective valves into engagement with their seats.

6. A shock absorber comprising, in combination, a casing presenting a fluid reservoir and a cylinder; a piston in the cylinder forming a compression chamber at each end thereof; a valve chamber; separate ducts connecting the respective compression chambers with the valve chamber; and a compound pressure release device within the valve chamber adapted to establish restricted flows of fluid from one or the other compression chambers into the one at the opposite end of the cylinder, said device comprising two valves, one supported by the other, both operating in the same direction to establish their respective fluid flows; a spring engaging each of said valves normally yieldably urging them to closed position, a single abutment member for both said springs; and means adapted to move the abutment member, concurrently to vary the pressure of said springs upon their respective valves.

EARL A. THOMPSON.
MAURICE OLLEY.